(12) United States Patent
Gunasekaran et al.

(10) Patent No.: US 11,469,912 B2
(45) Date of Patent: Oct. 11, 2022

(54) SECONDARY NODE STATUS CHANGE INDICATION TO ENABLE DYNAMIC POLICY AND QUOTA MANAGEMENT

(71) Applicant: Cisco Technology, Inc., San Jose, CA (US)

(72) Inventors: Arun Gunasekaran, Bangalore (IN); Raghavendra Suryanarayanarao Vidyashankar, Bangalore (IN); Om Prakash Suthar, Bolingbrook, IL (US); Rajaneesh Sudhakar Shetty, Bangalore (IN); Vivek Agarwal, Chelmsford, MA (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 85 days.

(21) Appl. No.: 17/062,833

(22) Filed: Oct. 5, 2020

(65) Prior Publication Data
US 2022/0109584 A1 Apr. 7, 2022

(51) Int. Cl.
| | | |
|---|---|---|
| H04L 12/14 | (2006.01) | |
| H04W 28/02 | (2009.01) | |
| H04L 47/20 | (2022.01) | |
| H04W 76/16 | (2018.01) | |
| H04W 88/06 | (2009.01) | |
| H04W 88/16 | (2009.01) | |

(52) U.S. Cl.
CPC .......... H04L 12/1407 (2013.01); H04L 47/20 (2013.01); H04W 28/0252 (2013.01); H04W 76/16 (2018.02); H04W 88/06 (2013.01); H04W 88/16 (2013.01)

(58) Field of Classification Search
CPC ............... H04L 12/1407; H04L 47/20; H04W 28/0252; H04W 76/16; H04W 88/06; H04W 88/16
See application file for complete search history.

(56) References Cited

U.S. PATENT DOCUMENTS

| | | | |
|---|---|---|---|
| 9,015,318 B1 * | 4/2015 | Batz | .................... H04L 61/2503 709/224 |
| 10,567,245 B1 | 2/2020 | Patil et al. | |
| 11,246,025 B1 * | 2/2022 | Mohan Raj | ........... H04W 60/04 |
| 2006/0182131 A1 * | 8/2006 | Dziekan, Jr. | ............ H04L 12/66 370/401 |
| 2007/0162289 A1 | 7/2007 | Olsson et al. | |

(Continued)

OTHER PUBLICATIONS

Osman N. C. Yilmaz et al., "Overview of LTE—NR Dual Connectivity", IEEE Communications Magazine, DOI: 10.1109/MCOM.2019.1800431, May 2019, 8 pages.

(Continued)

*Primary Examiner* — Afshawn M Towfighi
(74) *Attorney, Agent, or Firm* — Edell, Shapiro & Finnan, LLC

(57) ABSTRACT

Techniques are provided to communicate the serving Radio Access Network (RAN) element information to the packet core network to enable operators to provide differential treatment for fifth generation (5G) subscribers. The techniques presented herein fill these gaps and help drive faster adoption of Dual Connectivity New Radio (DCNR) subscribers by service operator to offer customized policy and quota management to address different business requirements in the 5G Non-Stand Alone (NSA) architecture.

20 Claims, 12 Drawing Sheets

(56) References Cited

U.S. PATENT DOCUMENTS

| | | |
|---|---|---|
| 2012/0087330 A1 | 4/2012 | Zhu et al. |
| 2012/0257571 A1* | 10/2012 | Liao ............... H04W 88/16 370/328 |
| 2012/0281674 A1* | 11/2012 | Jackson ............ H04M 15/66 370/331 |
| 2014/0146746 A1* | 5/2014 | Forsman ........... H04W 28/24 370/328 |
| 2016/0198336 A1* | 7/2016 | Kim ................. H04L 65/103 455/433 |
| 2017/0013529 A1* | 1/2017 | Persson ............ H04W 36/30 |
| 2017/0150403 A1* | 5/2017 | Persson ............ H04W 76/10 |
| 2018/0288648 A1* | 10/2018 | Juneja ........... H04W 28/0247 |
| 2018/0288826 A1 | 10/2018 | Chiba |
| 2019/0387424 A1 | 12/2019 | Yiu et al. |
| 2020/0077331 A1 | 3/2020 | Horn et al. |
| 2020/0092198 A1 | 3/2020 | Faccin et al. |
| 2020/0092758 A1 | 3/2020 | Youn et al. |
| 2020/0221339 A1 | 7/2020 | Gottwerth et al. |

OTHER PUBLICATIONS

Somaraju Kaki et al., "Optimizing Signaling in 5G Non-Standalone Network Deployments Enabled With Presence Reporting Area", Technical Disclosure Commons Defense Publication Series, Oct. 16, 2018, 12 pages.

ETSI, "LTE; Evolved Universal Terrestrial Radio Access Network (E-UTRAN); S1 Application Protocol (S1AP) (3GPP TS 36.413 version 15.3.0 Release 15)", ETSI TS 136 413 V15.3.0, Sep. 2018, 379 pages.

3GPP, 3rd Generation Partnership Project; Technical Specification Group Core Network and Terminals; 3GPP Evolved Packet System (EPS); Evolved General Packet Radio Service (GPRS) Tunnelling Protocol for Control plane (GTPv2-C); Stage 3; (Release 16), 3GPP TS 29.274 V16.5.0, Sep. 2020, 396 pages.

3GPP, 3rd Generation Partnership Project; Technical Specification Group Core Network and Terminals; Policy and Charging Control (PCC); Reference points (Release 16), 3GPP TS 29.212 V16.4.0. Sep. 2020, 287 pages.

* cited by examiner

SECONDARY NODE STATUS CHANGE INDICATION TO ENABLE DYNAMIC POLICY AND QUOTA MANAGEMENT

TECHNICAL FIELD

The present disclosure relates to mobile network communications.

BACKGROUND

Many incumbent mobile service operators are deploying fifth generation (5G) as Non-Stand Alone (NSA) with fourth generation (4G) Control and User Plane Separation (CUPS). NSA leverages the existing Long Term Evolution (LTE) radio access and Evolved Packet Core (EPC) to anchor 5G New Radio (NR) devices using the Dual Connectivity (DC) feature. NSA Option-3X is a widely accepted deployment option where the radio access network is composed of a 4G eNB as the master node and a 5G gNB as the secondary node. Deployments of 5G gNB's is spotty and not contiguous across a large geography.

A DC-enabled User Equipment (UE) first registers for mobile data service with the 4G EPC network. Based on an UE measurement report, the 4G eNB communicates with the 5G-NR gNB and enables the UE to simultaneously connect to the 4G and 5G networks. This allows the Radio Access Network (RAN) to move one or more UE bearers seamlessly between different access network types (Evolved Universal Terrestrial Radio Access Network (EUTRAN)/LTE/4G and NR/5G).

DESCRIPTION OF EXAMPLE EMBODIMENTS

Overview

In accordance with an example embodiment, mechanisms are provided to communicate the serving RAN element information to the packet core network to enable operators to provide differential treatment for 5G subscribers. At a packet data network gateway entity in a mobile core network, a method is provided that includes receiving a first modify bearer request message that includes a secondary node status change indication for wireless access network service being provided to a user equipment that has dual connectivity capability to wirelessly connect to a first access network and to a second access network. The secondary node status change indication including information indicating a change in user-data session serving network status as between the user equipment and a first radio access network element in the first access network or a second radio access network element in the second access network. The method further includes detecting the secondary node status change indication in the first modify bearer request message. Finally, the method includes, based on detecting the secondary node status change indication in the first modify bearer request message, sending to a policy and charging rules entity a first request update message that includes information about the change in serving status.

Example Embodiments

E-UTRAN and New Radio, Dual Connectivity (EN-DC) technology enables the introduction of 5G services with higher data rates and other capabilities. This approach enables 5G capable User Equipment (UE) to attach to 4G and 5G new radio (NR), that permits service providers to roll out 5G services on existing 4G core networks with NSA capabilities.

Figures 1A, 1B:
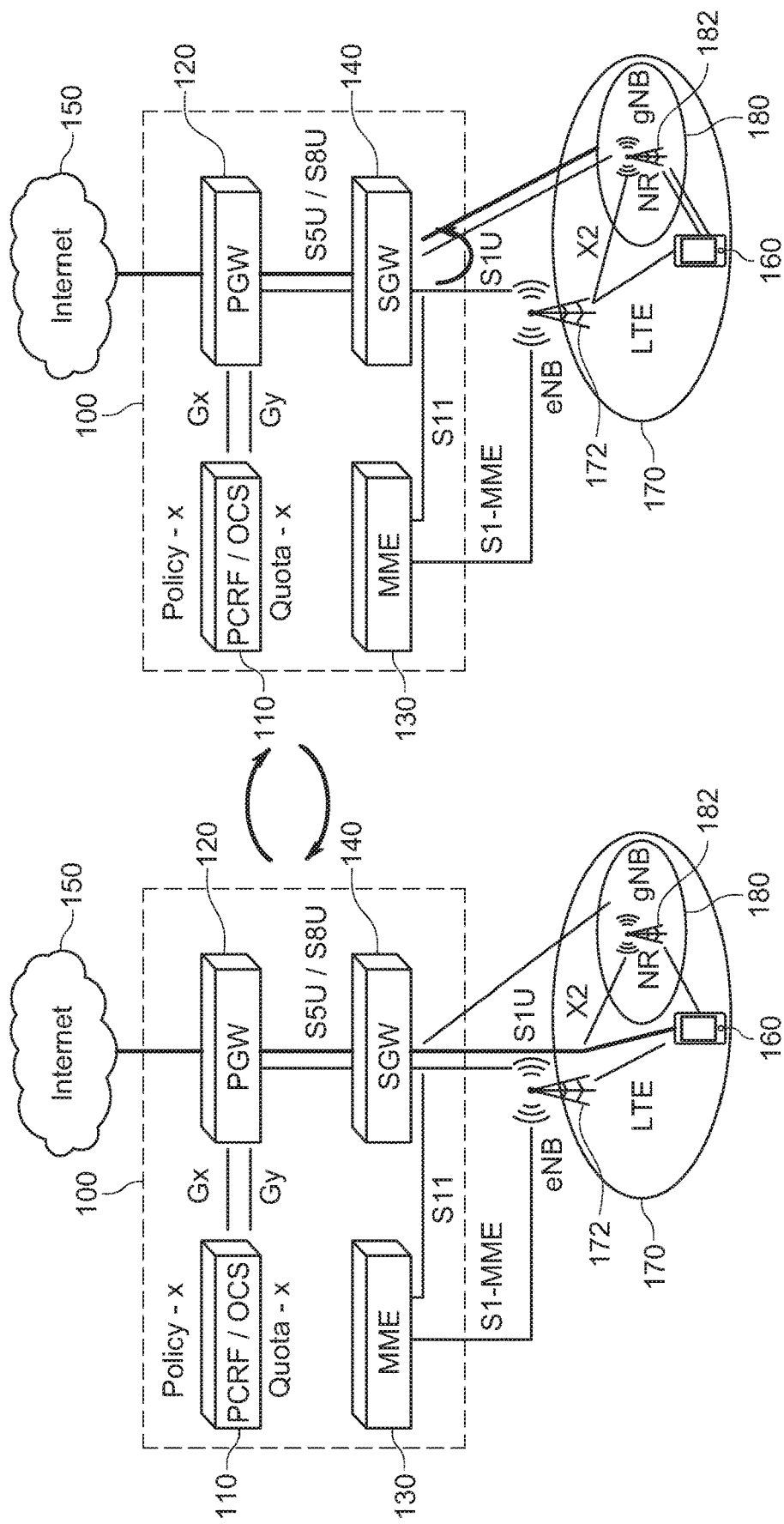
FIGS. 1A and 1B are block diagrams illustrating the LTE to NR mobility limitations in the 5G NSA Option-3X architecture.

Referring to FIGS. 1A and 1B, diagrams are shown of mobile networks that are configured for secondary node addition. Both figures shown a mobile core network 100 that includes a Policy and Charging Rules Function (PCRF) that may be integrated with an Online Charging System (OCS) as shown at 110, a Packet Data Network Gateway (PGW) 120, a Mobility Management Entity (MME) 130, and a Serving Gateway (SGW) 140. The PCRF/OCS entity 110 may manage Policies and Quota for User Equipment (UE) subscribers/users. FIGS. 1A and 1B show UE 160, as an example. The PGW 120 interfaces with the Internet 150 to communicate UE traffic to/from the Internet 150.

FIGS. 1A and 1B show a RAN 170 that is based on a first access network type, such as 4G/LTE. RAN 170 includes, in an oversimplified form, an eNB 172. In addition, FIGS. 1A and 1B show a RAN 180 that is based on a second access network type, such as 5G/NR. The RAN 180 includes, in an oversimplified form, gNB 182.

It should be understood that the RAN 170 and RAN 180 may be based on dedicated physical entities, such as eNBs and gNBs, or may be implemented as virtualized RANs (vRANs), including disaggregated vRANs. The eNB 172 and gNB 182 may be disaggregated in a vRAN architecture into different vRAN components.

In some instances, a vRAN architecture can be implemented as a disaggregated vRAN architecture that includes the split of a base station, such as an eNB or a gNB, into a Central (or Centralized) Unit (CU), one or several Distributed Units (DUs), and one or several Radio Units (RUs). Further disaggregation may include separation of the CU into a Central Unit Control Plane (CU-CP) component and a Central Unit User Plane (CU-UP) component. In some instances, certain vRAN components may also be referred to as virtualized components (e.g., virtualized DU (vDU) components, and/or virtualized CU (vCU) components). For a vRAN architecture, one or more RU(s) can interface with a DU component, which further interfaces with a CU-CP component and a CU-UP component. In some instances, such as for shared cell vRAN architectures, multiple DUs (each interfacing with corresponding RU(s)) can interface with a CU-CP component and a CU-UP component.

The interfaces between the various entities shown in FIGS. 1A and 1B are indicated as such by name in the figures.

UE 160 has EN-DC capabilities such that it can connect simultaneously to an LTE Master Node eNB (MNeNB), e.g., eNB 172, and to a 5G-NR Secondary Node gNB (SN-gNB), e.g., gNB 182.

In FIG. 1A, the UE 160 is attached to the eNB 172 of the RAN 170. That is, the UE 160 first registers for service with a Radio Access Technology (RAT) type as EUTRAN in the 4G EPC via the (LTE) eNB 172 of RAN 170.

Later, the UE 160 starts reporting measurements on the 5G radio, gNB 182, and if the signal quality for the UE 160, qualifies for 5G service, then the eNB 172 communicates with the (5G-NR) gNB 182 to assign resources for a 5G bearer. The 5G-NR resource assignment is then signaled to the UE 160 via an LTE Radio Resource Control (RRC) Connection Reconfiguration message and towards the 4G core network 100 through an Enhanced Radio Access Bearer (E-RAB) modification indication procedure to indicate the change in the S1U bearer address on the RAN side. Currently, there is no indication of secondary node addition or RAT change in the E-RAB modification procedure.

Moreover, the policy and quota allocation remains same for a 5G subscriber in both the LTE coverage area (in FIG. 1A) and the NR coverage area (in FIG. 1B). In the current NSA architecture, there is no efficient mechanism for the RAN to communicate the serving access node of the UE bearer to the mobile packet core network 100. This makes it impossible for operators to dynamically apply differential treatment for services (i.e., policy and quota allocation).

In secondary node addition, the 4G mobile core network 100 is continued to be used for handling UE traffic even if the UE moves to the SN-gNB, e.g., gNB 182, for AN connectivity. The PGW 120 and PCRF/OCS 110 are not aware that the UE moves to the SN-gNB. The challenge is to perform differential billing when a UE has moved from the 4G AN to the 5G AN.

Presented herein is a mechanism to communicate the serving RAN element information to the packet core and thereby enable operators to provide differential treatment for 5G subscribers. The mechanisms presented herein involve providing a signaling procedure about the UE AN change, so that quota and policies and related billing can be applied appropriately. Examples of quota and policy aspects involved may include how much uplink (UL) and downlink (DL) data the UE is using, Quality of Service (QoS), etc. The 4G AN has less bandwidth capabilities than the 5G AN. 4G uses less quota than in the 5G network. Thus, it is advantageous to know the status of the user-data session (bearer) serving network when the UE is DC capable. The notification associated with DC-NR may be used in the packet core to manage the quota for subscribers. This solution is useful for "greenfield" mobile network operators.

NSA Options, such as Option-3, Option-3A and Option-3X which related to LTE-Assisted options for EN-DC scenarios, have been developed to deal with various ways that mobile network operators may evolve between different access network technologies in their deployments. In Option-3, there is no connectivity from the gNB 182 to the core network 100. In Option-3A, the gNB 182 has an S1-U interface to the core network 100, but no X2 interface to the eNB 172. In Option-3X, the gNB 182 has an S1-U interface to the core network 100 and an X2 interface to the eNB 172. The techniques presented herein are applicable to Option-3, Option-3A and Option-3X.

Event Trigger Configuration (Gx)

During the initial DCNR attach procedure as shown in FIG. 1A, PCRF/OCS 110 learns the user type based on the user profile of the UE 160 and configures a newly introduced SN_STATUS_INFO_CHANGE event trigger to identify the secondary node addition/modification and deletion in the serving RAN. This may involve changes to 3GPP Release 16 TS 29.212: Section—5.3.7 Event Triggers Attribute Value Pair (AVP). In other words, the PCRF/OCS 110 sets a new event trigger to the PGW 120 indicating to notify the PCRF when there is a secondary node status change.

Secondary Node Status Information Indication to SGW/PGW (S11 and S5/S8)

In accordance with embodiments presented herein, the MME 130 initiates a GTPv2-C Modify Bearer procedure towards the SGW 140 upon reception of an S1AP E-RAB Modification indication from the eNB 172. The MME 130 processes the SN_Status_Info information element (IE) received in the S1AP E-RAB Modification indication from the eNB 172 and maps this information into a newly introduced IE (SN Status information) in the GTPv2-C modify bearer request along with an indication flag to highlight the SN status change. This may involve changes to 3GPP Release 16 TS 29.274: Section 7.2.7.

Secondary Node Status Change Event Trigger (Gx)

The PGW 120 processes the SN Status information received in the GTPv2-C modify bearer request and triggers the SN_STATUS_INFO_CHANGE event towards the PCRF by including the newly introduced SN-Status-Info AVP in the Event-Report-Indication grouped AVP as per the event trigger installed by Credit Control Application (CCA-I) message during the attach procedure. This may involve changes to 3GPP TS 29.212 Section 5.3.30 Event-Report-Indication AVP (All access types).

Figure 2A:
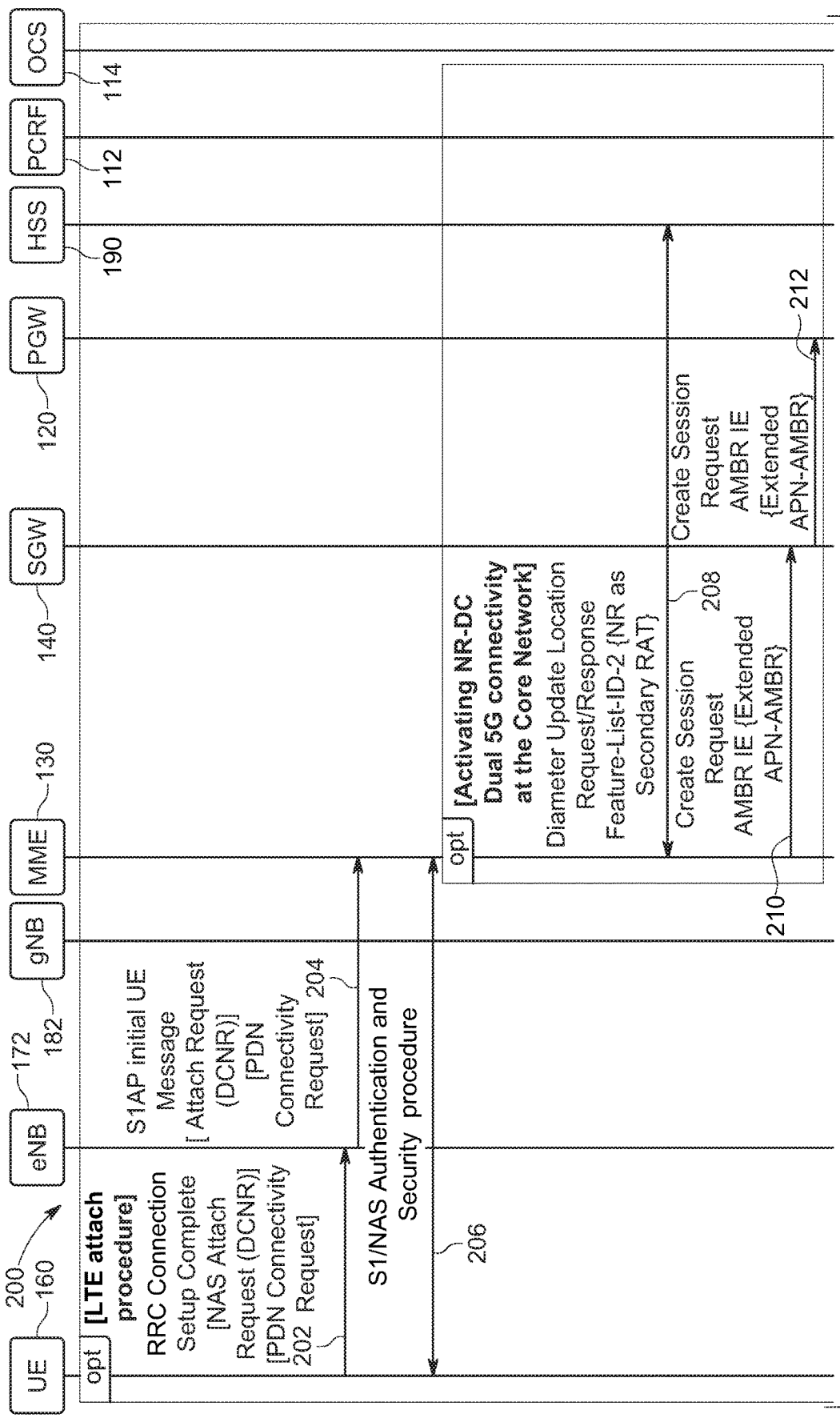
FIGS. 2A and 2B illustrate a call flow diagram depicting operations of a DC-NR attach procedure during which a secondary node status change trigger is configured on a packet data network gateway, according to an example embodiment.
Figure 2B:
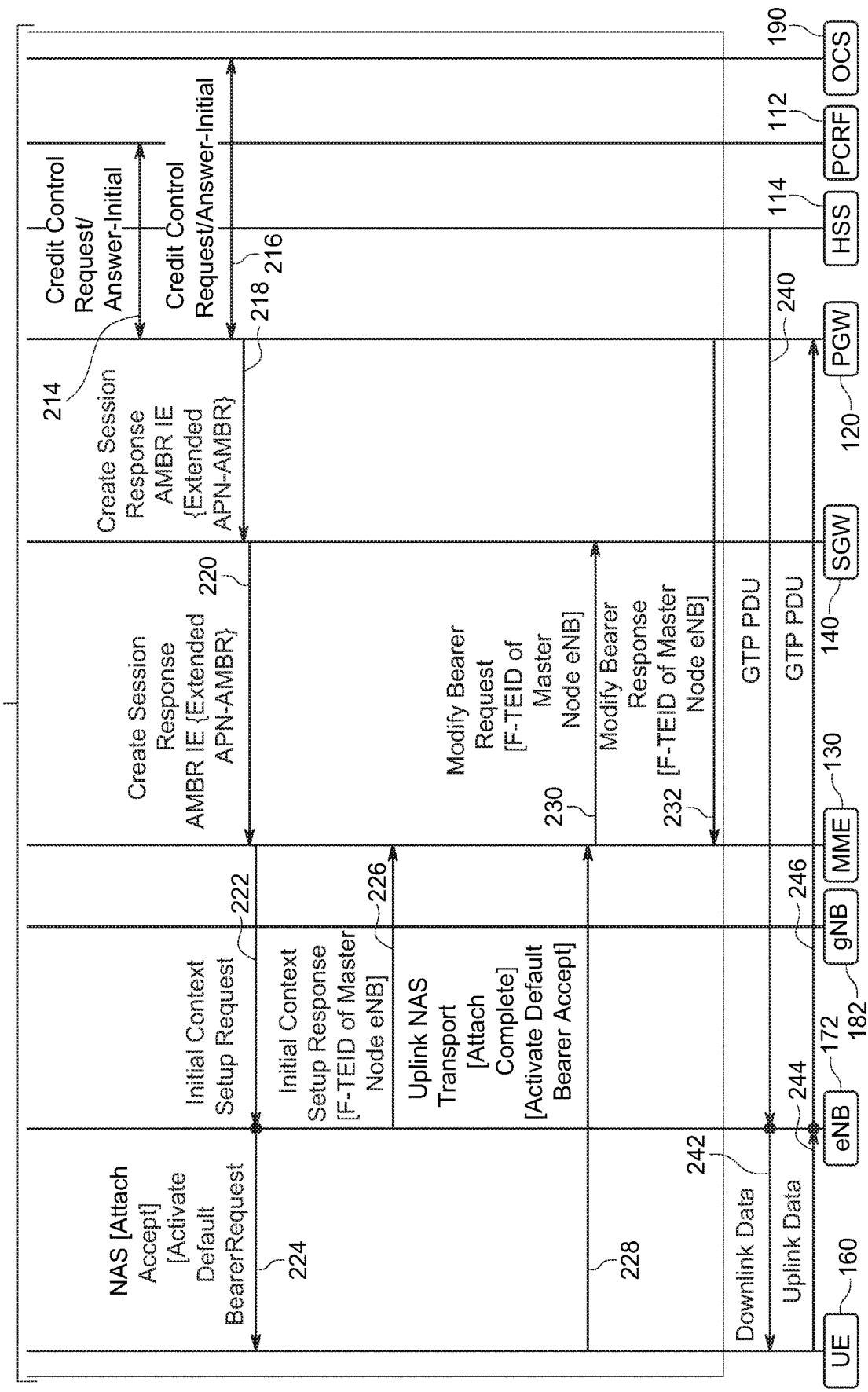

FIGS. 2A and 2B illustrate a call flow for the DCNR attach procedure 200, and in particular shows how the PCRF configures the SN_STATUS-INFO_CHANGE event trigger on the PGW 120. This allows notification to the PCRF that a UE has moved from the 4G RAN to the gNB (5G RAN). In the call flow of FIGS. 2A and 2B, the PCRF and OCS are broken out as separate entities denoted by reference numerals 112 and 114, respectively.

At 202, the UE 160 signals the completion of the RRC connection to RAN. The message carries the non-access stratum (NAS) Attach Request. The DCNR bit in the "UE Network Capability" information element (IE) in the NAS Attach Request is set. This signals to the 4G/LTE core network that the UE supports DC with LTE and NR.

At 204, the eNB 172 sends the S1AP Initial UE message to the MME 130. The Initial UE message carries the NAS Attach Request sent by the UE 160, which includes the DCNR bit in UE Network Capability IE set.

At 206, the MME 130 and UE 160 successfully complete the NAS authentication and security procedure.

At 208, the MME 130 and Home Subscriber Server (HSS) 190 complete the authorization procedure. As part of authorization procedure, MME and HSS advertises the DCNR support by sending the NR as Secondary RAT feature. The HSS 190 also indicates the UE 160 is allowed to have NR as secondary RAT. The HSS 190 checks if the UE is permitted to use DC and confirms that the UE is authorized for DCNR services.

At 210, the MME 130 sends the Create Session Request message to the SGW 140 with the extended Access Point Name Aggregate Maximum Bit Rate (APN-AMBR) values in existing AMBR IE. At 212, the SGW 140 passes the Create Session Request message to the PGW 120 with the extended APN-AMBR values in the existing AMBR IE.

At 214, the PGW 120 initiates the initial credit control procedure by sending Credit Control Request-Initial (CCR-I) message to the PCRF 112. The PCRF 112 responds to the CCR-I with Credit Control Answer-Initial (CCA-I) message to the PGW 120. The PCRF 112 learns the user type based on the user profile and configures/installs the newly introduced SN_STATUS_INFO_CHANGE event trigger to identify the Secondary Node addition/modification and deletion within the serving RAN. This may involve changes to 3GPP TS 29.212: Section—5.3.7 Event Triggers AVP. A similar CCR-I/CCA-I exchange occurs at 216 between the PGW 120 and the OCS 114. The PGW 120 obtains the quota from the OCS 114 at this point.

At 218, the PGW 120 sends a Create Session Response to the SGW 140 with the extended APN-AMBR. The SGW 140 sends a Create Session Response to the MME 130 with the extended APN-AMBR, at 220.

At 222, the MME 130 responds to the eNB 172 with a NAS Attach Accept in the S1AP Initial Context Setup Request message, and at 224, the eNB 172 passes on the NAS Attach Accept message to the UE 160.

At 226, the eNB 172 completes the initial context setup procedure by sending the Initial Context Setup Response message to the MME 130.

The UE 160 sends the NAS Attach Accept and Activate Default Bearer Accept message to the 130 MME through the eNB 172, at 228. At 230, the MME 130 triggers the modify bearer procedure by sending a Modify Bearer Request message towards the SGW 140 to change the Fully Qualified Tunnel Endpoint Identifier (F-TEID) of the Master eNB 172 for downlink data. At 232, the SGW 140 accepts the modification and acknowledges with "Modify Bearer Response" to the MME 130.

Thereafter, downlink data flows on the default bearer from the PGW to the eNB 172, as shown at 240. Downlink data flows on the data radio bearer from the eNB 172 to the UE 160, as shown at 242.

Uplink data flows on the data radio bearer from the UE to the eNB 172, at 244, and uplink data flows on the default bearer from the eNB 172 to the PGW 120, as shown at 246.

Secondary Node Status Information Indication to Mobility Management Entity (S1-MME)

Referring back to FIG. 1B, as part of the secondary node addition/modification/deletion procedure, the LTE eNB 172 initiates an S1AP E-RAB Modification indication procedure towards the MME 130 in which the eNB 172 includes the newly introduced IE (Secondary Node Status Information—SN_STATUS_INFO_CHANGE) to indicate the change in secondary node status. This may involve changes to 3GPP Release 16 TS 36.413: Section 9.2.1.146 SN Status information.

Figure 3A:
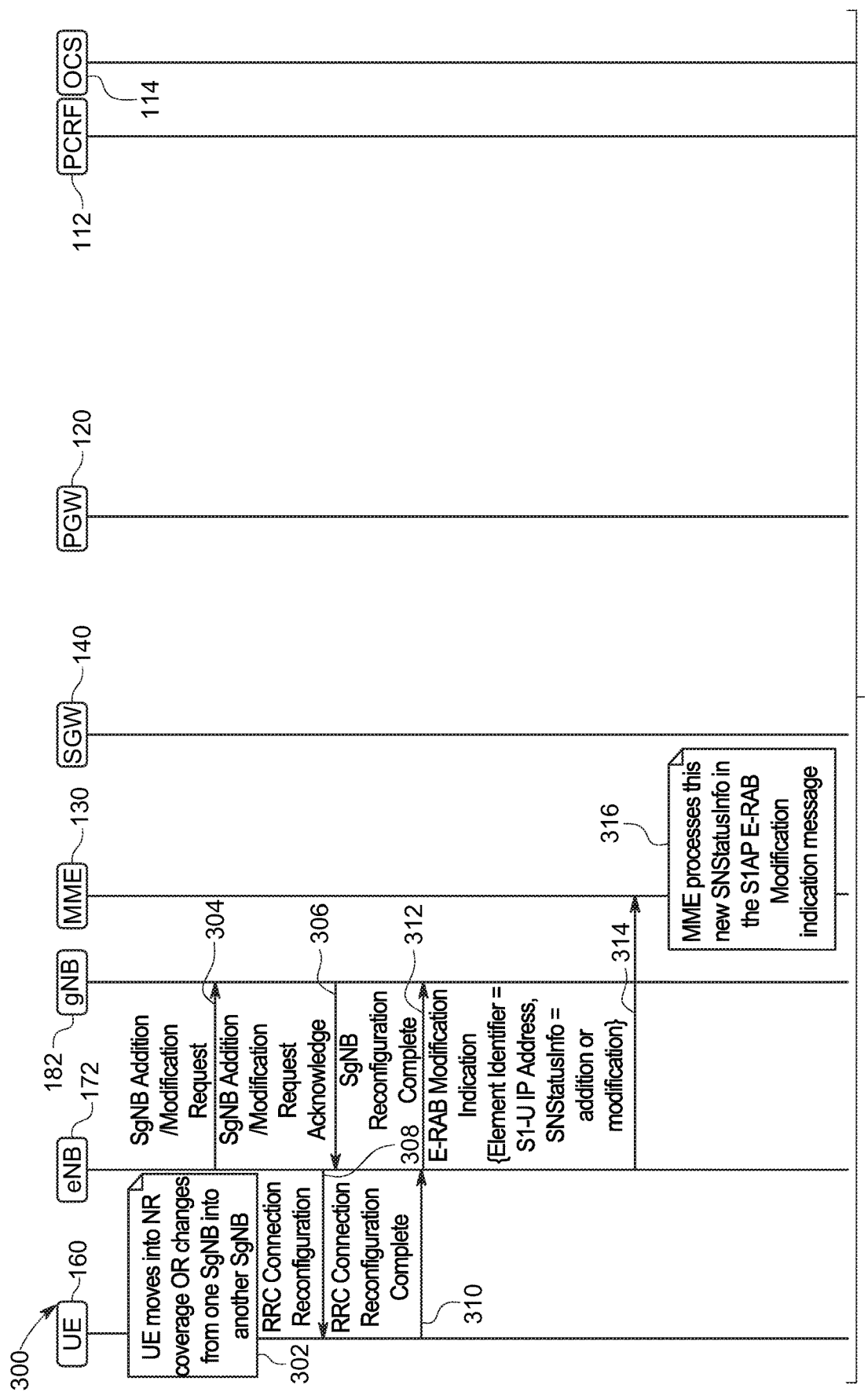
FIGS. 3A-3C illustrate a call flow diagram depicting operations of a secondary node addition/modification procedure, according to an example embodiment.
Figure 3B:
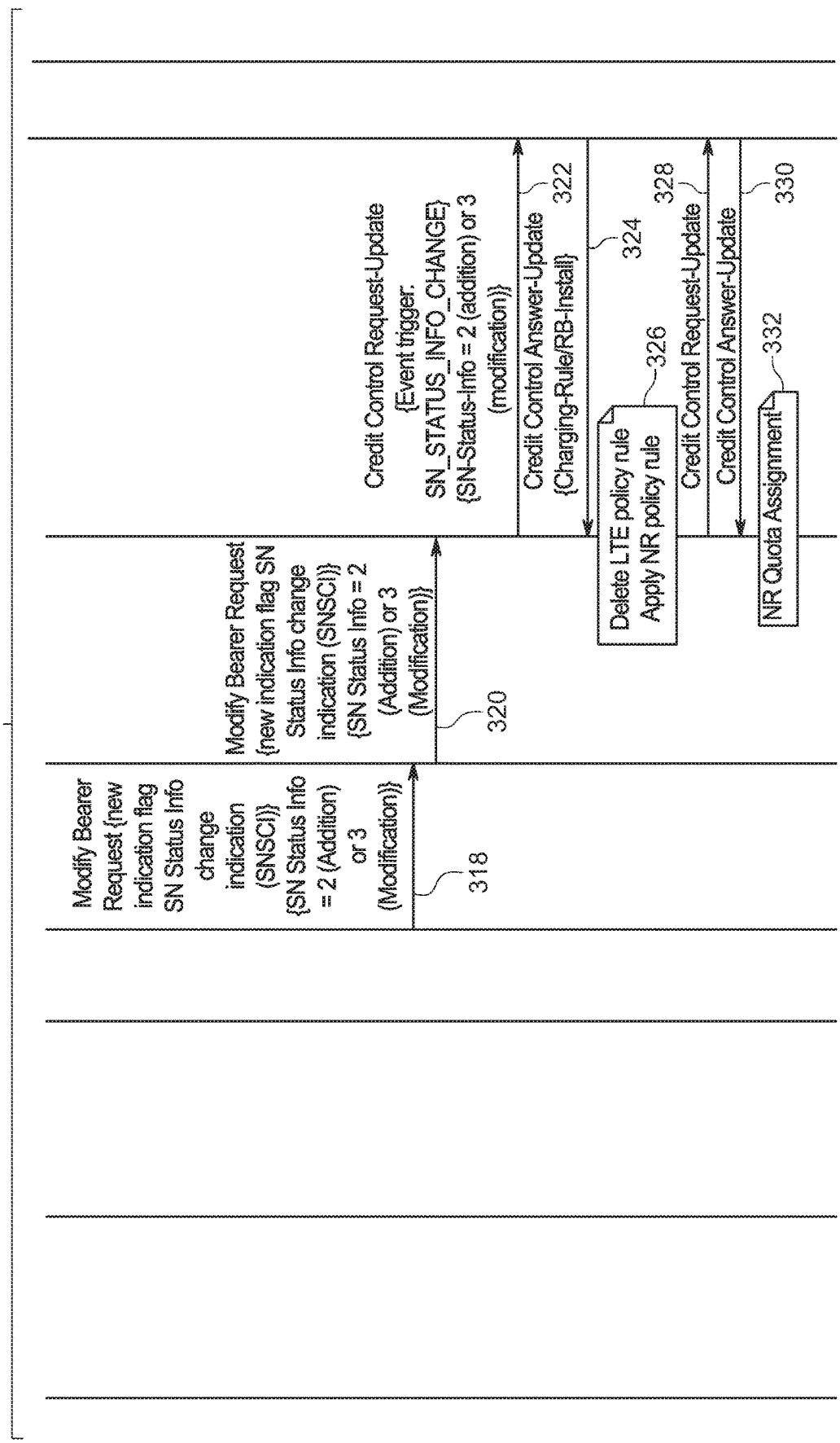
Figure 3C:
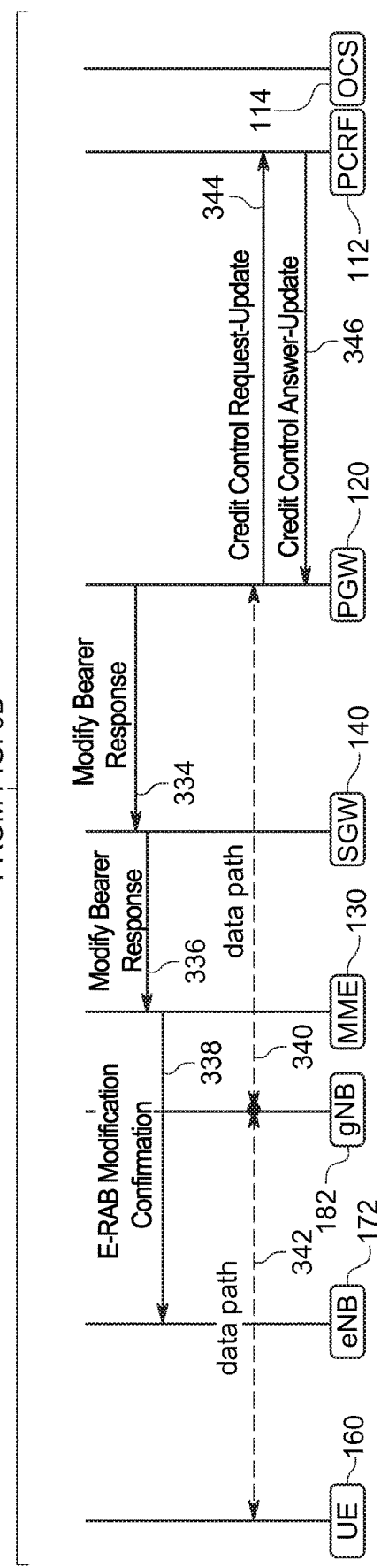

Reference is now made to FIGS. 3A-3C, which illustrate a call flow for a Secondary Node Addition/Modification procedure 300 for 5G NSA Option-3/3A/3X. In this call flow, the eNB 172 may be referred to as the "master node (MN)" and the gNB 182 may be referred to as the "secondary node (SN)". After successful completion of the attach procedure between the UE 160 (which has is EN-DC capable) and the core network, the UE moves into NR coverage or changes from one SgNB to another SgNB, as shown at 302. The eNB 172 decides to add/modify the gNB 182 as a secondary node. At 304, the eNB 172 sends a secondary node SgNB Addition/Modification Request to the gNB 182. The SgNB Addition/Modification Request message carries the RRC and Radio Bearer configuration, including the UE capabilities and security information. At 306, the gNB 182 admits the resource request and allocates respective radio resources and, depending on the bearer option, respective transport network resources. The gNB 182, at 306, provides the radio resource configuration to the eNB 172 in a NR RRC configuration contained in the SgNB Addition/Modification Request Acknowledge message.

At 308, the eNB 172 sends to the UE 160 the RRC Connection Reconfiguration message including the NR RRC configuration, without modifying it. The UE 160 applies the new configuration and replies to the eNB 172 with an RRC Connection Reconfiguration Complete message. At 312, the eNB 172 informs the gNB 182 that the UE 160 has completed the reconfiguration procedure successfully via a SgNB Reconfiguration Complete message.

The eNB 172 initiates the S1AP E-RAB Modification Indication procedure by sending an E-RAB Modification Indication message to the MME 130 to notify the MME 130 that the data bearer switched from the eNB 172 to the gNB 182. The aforementioned IE SN_STATUS-INFO_CHANGE included in the E-RAB Modification Indication to indicate the reason for the change in secondary node status. This may involve a change to 3GPP TS 36.413: Section 9.2.1.146 SN Status information.

At 316, the MME 130 processes the new SN_STATUS-INFO_CHANGE in the E-RAB Modification Indication and maps this information to an SN Status Info IE in GTPv2-C modify bearer request, along with an indication flag to indicate the SN status change as Addition/Modification. This may involve a change proposed to 3GPP TS 29.274: Section 7.2.7.

At 318, the MME 130 sends to the SGW 140 the Modify Bearer Request to indicate the change in S1 bearer downlink connection to the gNB 182. The SN Status Info may be a first value to indicate Addition or a second value to indicate Modification. For example SN Status Info=2 for Addition, 3 for Modification.

At 320, the SGW 140 sends to the PGW 120 a Modify Bearer Request message with the SN status change indication flag.

At 322, the PGW 120 processes the SN Status Info received in GTPv2-C Modify Bearer Request and triggers the SN_STATUS_INFO_CHANGE event towards the PCRF 120 by including the newly introduced SN-Status-Info AVP with the value for Addition/Modification in the Event-Report-Indication grouped AVP in a CCR-Update (CCR-U) as per the event trigger installed by CCA-I message during attach procedure depicted in FIGS. 2A and 2B. This may involve changes to 3GPP TS 29.212: Section 5.3.30 Event-Report-Indication AVP. Thus, the PGW 120 sends to the PCRF 112 CCR-U message to notify the PCRF 112 about the modification in the packet core session for the UE 160.

At 324, the PCRF 112 sends to the PGW 120 a CCA-U to acknowledge the acceptance of the changes received in the CCR-U message. Optionally, the PCRF 112 may include a new charging rule/rule base as per a configuration for installation at the PGW 120. At 26, the PGW 120 may delete the LTE policy rule and instead apply a NR policy rule.

As per the new rules/rule base received by the PGW 120, at 328, the PGW 120 may trigger a CCR-U update towards the OCS 114. At 330, the OCS 114 responds with CCA-U and assigns a new quota (NR quota) as per the configuration. The PGW 120 stores this NR quota assignment at 332.

At 334, the PGW 120 sends the Modify Bearer Response message to the SGW 140. The SGW 140 switches the downlink path to the secondary node, e.g., gNB 182, and at 336, sends the Modify Bearer Response message to the MME 130. At 338, the MME 130 sends the E-RAB Modification Confirmation message to the eNB 172 to complete the E-RAB modification indication procedure.

Thereafter, the PGW 120 directs the downlink data to the gNB 182, as shown at 340. The gNB 182 directs the downlink data to the UE 160, as shown at 342.

As per the new quota assignment, at 344, the PGW 120 monitors the UE usage and notifies the OCS 114 using a CCR-U message. The OCS 114 responds with a CCA-U to PGW 120, at 346.

Figure 4:
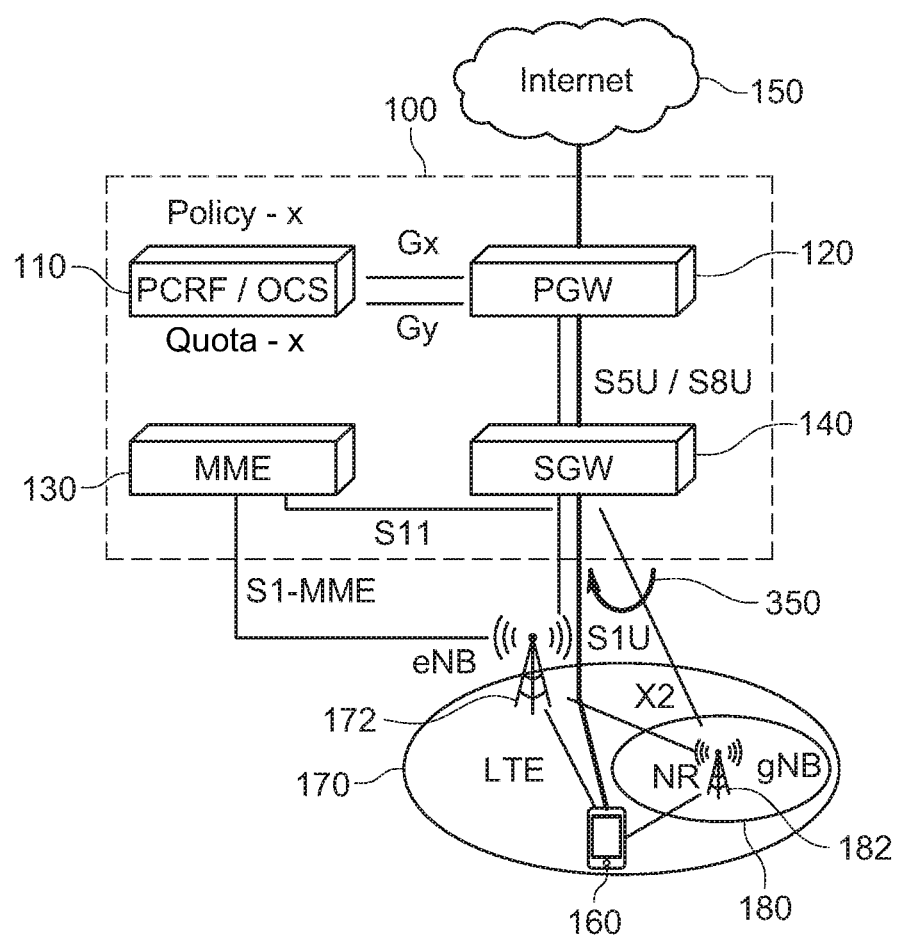
FIG. 4 is a block diagram depicting at a high level a secondary node deletion procedure, according to an example embodiment.

At some point, the UE may return to the 4G RAN because it has moved out of NR coverage, and thus will return to data service through the eNB of the 4G RAN. This is shown in FIG. 4. To accommodate this situation, there is a procedure for deleting the secondary node in the 5G NSA Option-3X Architecture. This involves signaling via the S1U interface, as shown at 350 in FIG. 4, but described in more detail below.

Figure 5A:
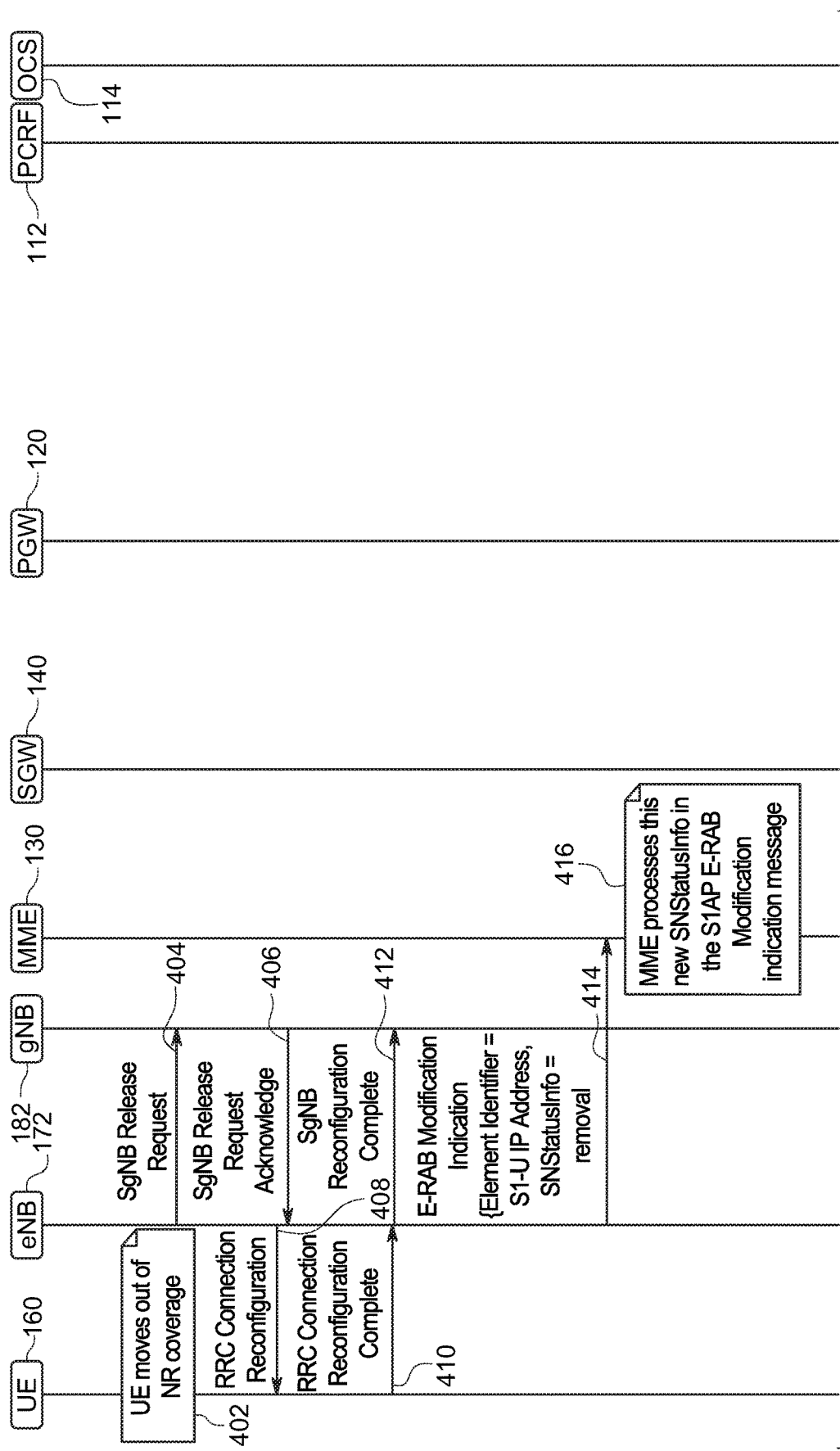
FIGS. 5A-5C illustrate a detailed call flow diagram for secondary node deletion, according to an example embodiment.
Figure 5B:
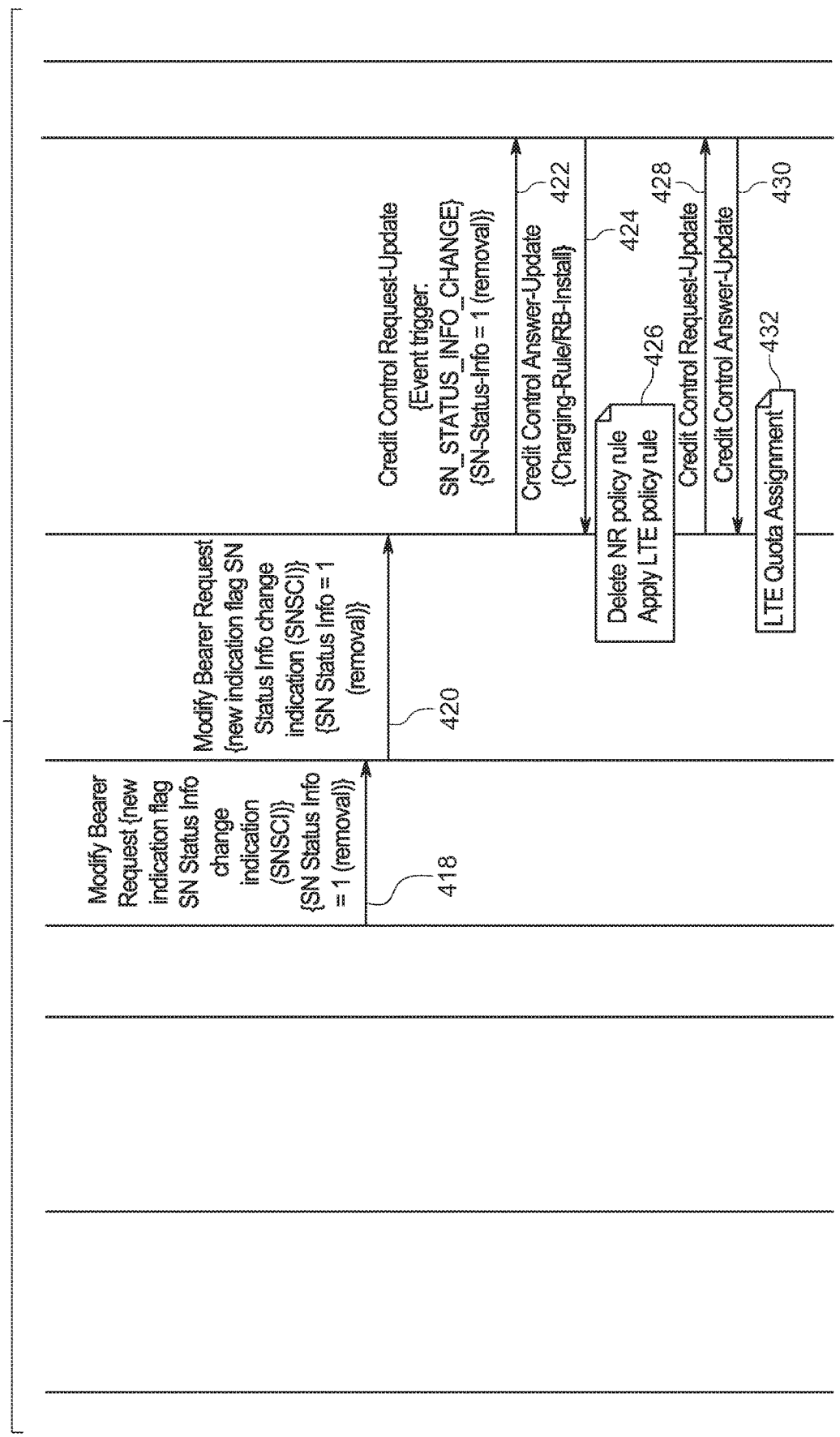
Figure 5C:
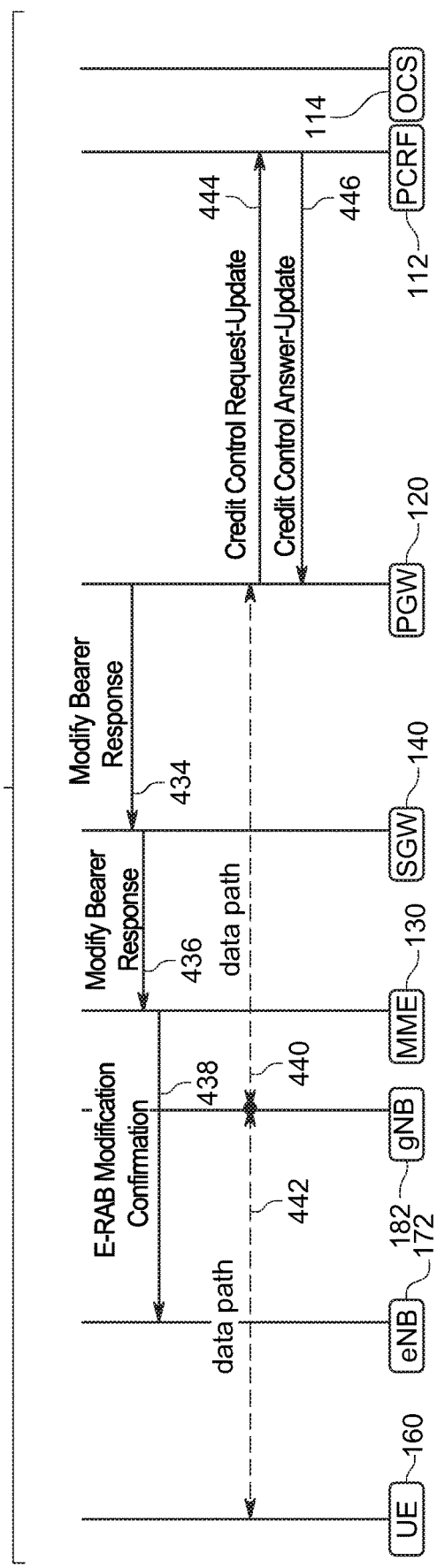

FIGS. 5A-5C illustrate a call flow for a Secondary Node Deletion procedure 400 for the 5G NSA Option-3X Architecture. The procedure 400 assumes that the EN-DC capable UE is already registered and connected in the 5G NSA core and a secondary node was added as part of the NR. At 402, the UE moves out of NR coverage. The eNB 172, at 404, initiates the SN release procedure by sending the SgNB Release Request message to the gNB 182. At 406, the gNB 182 confirms secondary node release by sending the SgNB Release Request Acknowledge message to eNB 172.

At 408, the eNB 172 indicates in the RRC Connection Reconfiguration message towards the UE 160 that the UE 160 is to release the entire secondary node configuration. The UE responds with a RRC Connection Reconfiguration Complete message to the eNB 172, at 410. At 412, the eNB 172 sends the "SgNB Reconfiguration Complete message to the gNB 182.

At 414, the eNB 172 initiates the S1AP E-RAB Modification Indication procedure by sending an E-RAB Modification Indication message to the MME 130. The eNB 172 will include the IE for SN Status Information configured for removal as an indication of the reason for change in the secondary node status. This may involve a change to 3GPP TS 36.413: Section 9.2.1.146 SN Status information.

At 416, the MME 130 processes the SN_Status_Info IE received in the S1AP E-RAB Modification Indication message from the eNB 172 and maps this information into the SN_Status_Info IE in the GTPv2-C modify bearer request along with the indication flag to set to indicate the SN status change as Removal. This may involve a change to 3GPP TS 29.274: Section 7.2.7. At 518, the MME 130 sends to the SGW 140 the Modify Bearer Request message to indicate the change in S1 bearer downlink connection to the eNB 172.

At 420, the SGW 140 sends to the PGW 120 a Modify Bearer Request message with the SN status change indication flag. The PGW 120 processes the SN status change information received in the GTPv2-C Modify Bearer Request and triggers the SN_STATUS_INFO_CHANGE event towards the PCRF by including the newly introduced SN_Status_Info AVP with the value as Removal in the Event-Report-Indication grouped AVP in the CCR-U as per the event trigger installed by CCA-I message during attach procedure depicted in FIGS. 2A and 2B. This may involve changes to 3GPP TS 29.212 Section 5.3.30 Event-Report-Indication AVP. At 422, the PGW 120 sends to the PCRF 112 the CCR-U to notify the PCRF about the modification in the session for the UE 160.

At 424, the PCRF 112 sends to the PGW a CCA-U to acknowledge the acceptance of the changes received in the CCR-U. Optionally, the PCRF 112 may include a new charging rules/rule base as per the configuration.

At 426, the PGW 120 deletes the NR policy rule and applies the LTE policy rule.

As per the new rules/rulebase received from the PCRF 112, the PGW 120 may trigger a CCR-U update towards the OCS 114, at 428. At 430, the OCS 114 responds with a CCA-U and assigns a new quota as per the configuration. The PGW 120 stores the LTE quota assignment received from the PCRF 112, at 432.

At 434, the PGW 120 sends the Modify Bearer Response message to the SGW 140. The SGW 140 switches the downlink path to the eNB 172 and sends the Modify Bearer Response message to the MME 130, at 436.

The MME 130 sends to the eNB 172 the E-RAB Modification Confirmation message to complete the E-RAB modification indication procedure, at 438.

At 440, the PGW 120 directs the downlink data to the eNB 172, and at 442, the eNB directs downlink data to the UE 160.

As per the new quota assignment, the PGW 120 monitors the UE usage and notifies the OCS 114 using CCR-U message, at 444. The OCS 114 responds with CCA-U to the PGW 120, at 446.

Figure 6:
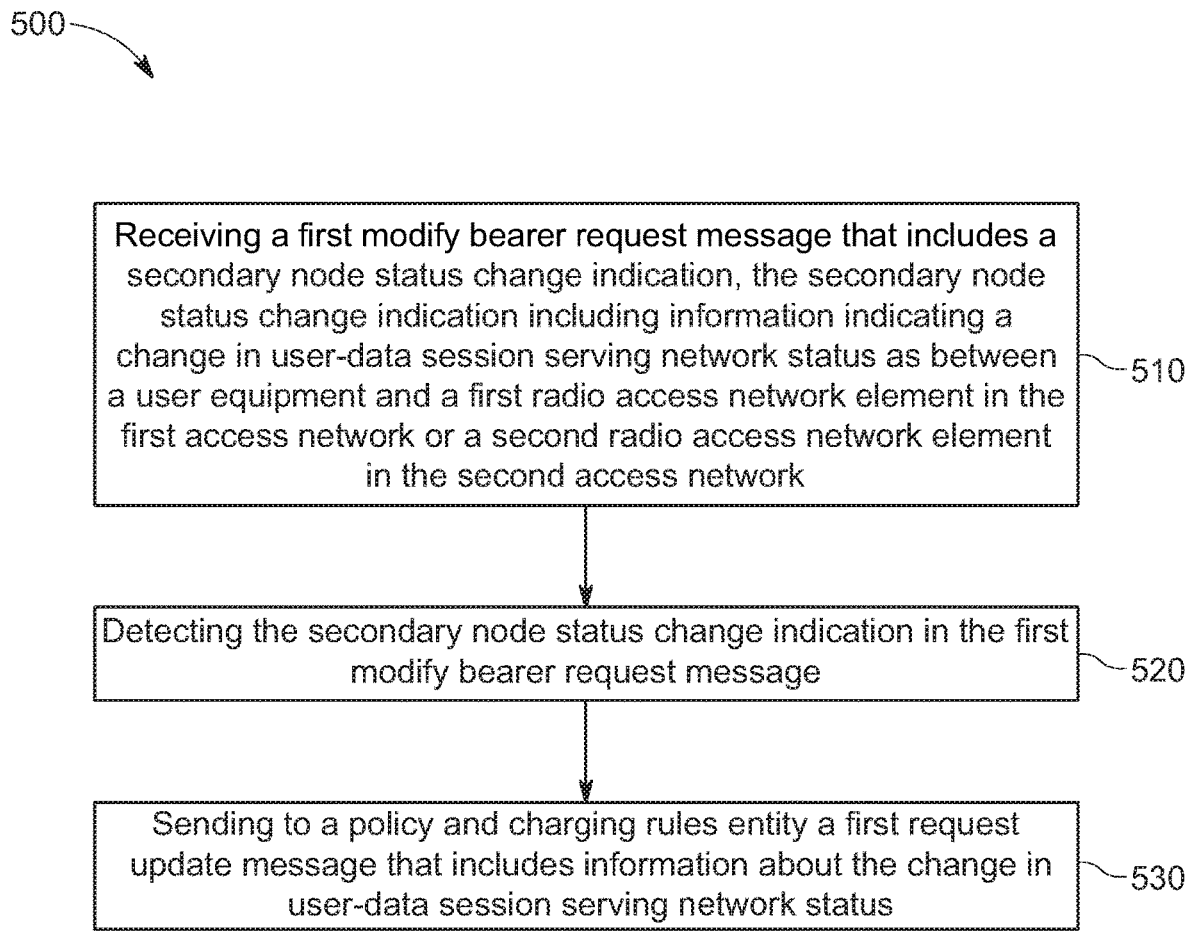
FIG. 6 is a flow chart depicting operations performed by a packet data network gateway to perform the secondary node addition/modification and deletion procedures presented herein, according to an example embodiment.

Reference is now made to FIG. 6. FIG. 6 illustrates a flow chart for a method 500 performed by an entity such as a PGW in a mobile core network, such as PGW 120 depicted in FIGS. 1A, 1B, and 2-5. Reference is also made to FIGS. 2-5 for purposes of the description of FIG. 6.

At 510, the PGW performs the operation of receiving a first modify bearer request message that includes a secondary node status change indication for wireless access network service being provided to a user equipment that has dual connectivity capability to wirelessly connect to a first access network and to a second access network. The secondary node status change indication includes information indicating a change in user-data session serving network status as between the user equipment and a first radio access network element (e.g., eNB 172) in the first access network (e.g., 4G RAN 170) or a second radio access network element (e.g., gNB 182) in the second access network (e.g., 5G/NR 180). The first modify bearer request message may originate from the SGW 140, which in turn obtained the first modify bearer request message from the MME 130 which generated it in response to an E-RAB Modification Indication message originally sent by the eNB 172.

At 520, the PGW performs the operation of detecting the secondary node status change indication in the first modify bearer request message.

At 530, based on detecting the secondary node status change indication in the first modify bearer request message, the PGW performs the operation of sending to a policy and charging rules entity a first request update message that includes information about the change in the user-data session serving network status.

As described above in connection with FIGS. 2A and 2B, there is some initial configuration of the PGW 120 to detect the secondary node status information change. Thus, the method 500 may further include, at some time prior to operation 510, operations in which the PGW sends to the policy and charging rules entity an initial credit control request message that includes information describing a type and profile of the user equipment, and responsive to the initial credit control request message, the PGW receives from the policy and charging rules entity an initial credit control answer message that contains information configured to cause installing of a secondary node status information change event trigger on the PGW. This latter step allows the PGW to detect and respond to the secondary node status change indication in the modify bearer request message received from the SGW. That is, in response to receiving the first modify bearer request message that includes the secondary node status change indication, the PGW generates the information about the change in user-data session serving network status included in first request update message based on the information contained in the initial credit control answer message.

In one form, the information about the change in user-data session serving network status may comprise an attribute value pair that indicates whether the user equipment is being served by the first radio access network element in the first access network or the second radio access network element in the second access network.

The method 500 may further include the PGW receiving, in response to the first request update message, from the policy and charging rules entity, a first answer update message indicating a change from a first charging policy to a second charging policy; and applying the second charging policy to traffic for the user equipment at the packet data network gateway entity The first modify bearer request message may be received from a mobility management entity in the mobile core network, and the secondary node status change indication in the first modify bearer request message includes information that indicates an addition or modification of the second radio access network element in the second access network for serving the user equipment. Further, the second charging policy may pertain to usage by the user equipment in the second access network.

The method 500 may further include the PGW sending to an online charging entity a credit control request update message that indicates the user equipment is being served by the second access network; and receiving from the online charging entity a credit answer update that includes a quota assignment for the user equipment in the second access network to enhance user equipment experience by granting more usage quota for data being served through the second access network.

The secondary node status change indication may be a first secondary node status change indication dedicated to additional or modification of a secondary node. However, at some point in time, the user equipment may obtain better coverage back in the first access network. Thus, at some point in time after the PGW had been applying the second charging policy, the PGW may further perform operations of: receiving a second modify bearer request message that includes a second secondary node status change indication that includes information indicating removal of the second radio access network element in the second access network as the user-data session serving network for serving the user equipment; and sending to the policy and charging rules entity a second request update message that includes information indicating removal of the second radio access network element in the second access network for serving the user equipment.

The PGW may further perform operations of: receiving, in response to the second request update message, from the policy and charging rules entity, a second answer update message indicating a change from the second charging policy to the first charging policy; and applying the first charging policy to traffic for the user equipment at the packet data network gateway entity. Furthermore, the PGW may perform operations of: sending to an online charging entity a credit control request update message that indicates the user equipment is being served by the first radio access network; and receiving from the online charging entity a credit control answer update message that includes a quota assignment for the user equipment in the first radio access network.

In accordance with one aspect, a method is provided to indicate secondary node status (e.g. addition/deletion/modification) to the packet core for a DCNR UE during initial attach and E-RAB modification procedures. In addition, a method is provided to enable differential quality of service (QoS) policies in the packet core for DCNR UE for managing resources. Further still, a method is provided to enable differential quota management for DCNR UE in LTE and NR coverage. Further, a method is provided to enable or disable online charging for DCNR UE based on LTE and NR coverage.

As explained above, in order to support the methods presented above, the following standard changes are proposed.

S1AP Protocol: Introduction of new IE "SNStatusInfo" to indicate the secondary node status by the eNB to the MME in an E-RAB Modification Indication message.

S1-MME Interface: eNB populates the "SNStatusInfo" IE with addition, modification and removal upon SN addition, modification, and release procedure, respectively.

GTPv2-C Protocol: Introduction of indication flag "SN Status change Indication (SNSCI)" and new IE "SN Status Info" to modify bearer request message.

S11 Interface: MME 130 processes the "SNStatusInfo" IE received in the E-RAB Modification Indication message and maps it to "SN Status Info" in the modify bearer request message along with indication flag set to "SN Status change Indication (SNSCI)".

S5/S8 Interface: SGW propagates the "SN Status change Indication (SNSCI)" indication flag and "SNStatusInfo" IE received in modify bearer request message over S11 interface to modify bearer request sent in S5/S8 interface towards PGW.

Diameter Gx Protocol: Introduction of new event trigger "SN_STATUS_INFO_CHANGE" to identify the secondary node status change in 5G NSA Option-3X architecture.

Gx Interface: PCRF dynamically installs the event trigger "SN_STATUS_INFO_CHANGE" in PGW to notify the secondary node status change.

Diameter Gx Protocol: Introduction of new Attribute Value Pair (AVP) "SN-Status-Info" to notify the secondary node addition, modification and removal status change.

Gx Interface: PGW processes the "SN Status change Indication (SNSCI)" indication flag and "SNStatusInfo" received in modify bearer request message. Based on the "SN_STATUS_INFO_CHANGE" event trigger installation, PGW decides to notify the PCRF over the Gx interface using "SN-Status-Info" AVP.

Quota Management: With the introduction of these mechanisms to dynamically allocate a new policy for 5G DCNR subscribers in 5G NSA Option-3X architecture, flexibility is provided to dynamically change the quota allocation policy for the 5G DCNR subscriber using the Gy interface.

In summary, due to lack of real-time secondary node status change indication, it is not possible to deploy many features such as dynamic policy and quota management, online charging etc., for 5G DCNR subscribers in 5G NSA Option-3X. The techniques presented herein fill these gaps and help drive faster adoption of DCNR subscribers by service operator to offer customized policy and quota management to address different business requirements in the 5G NSA architecture.

Figure 7:
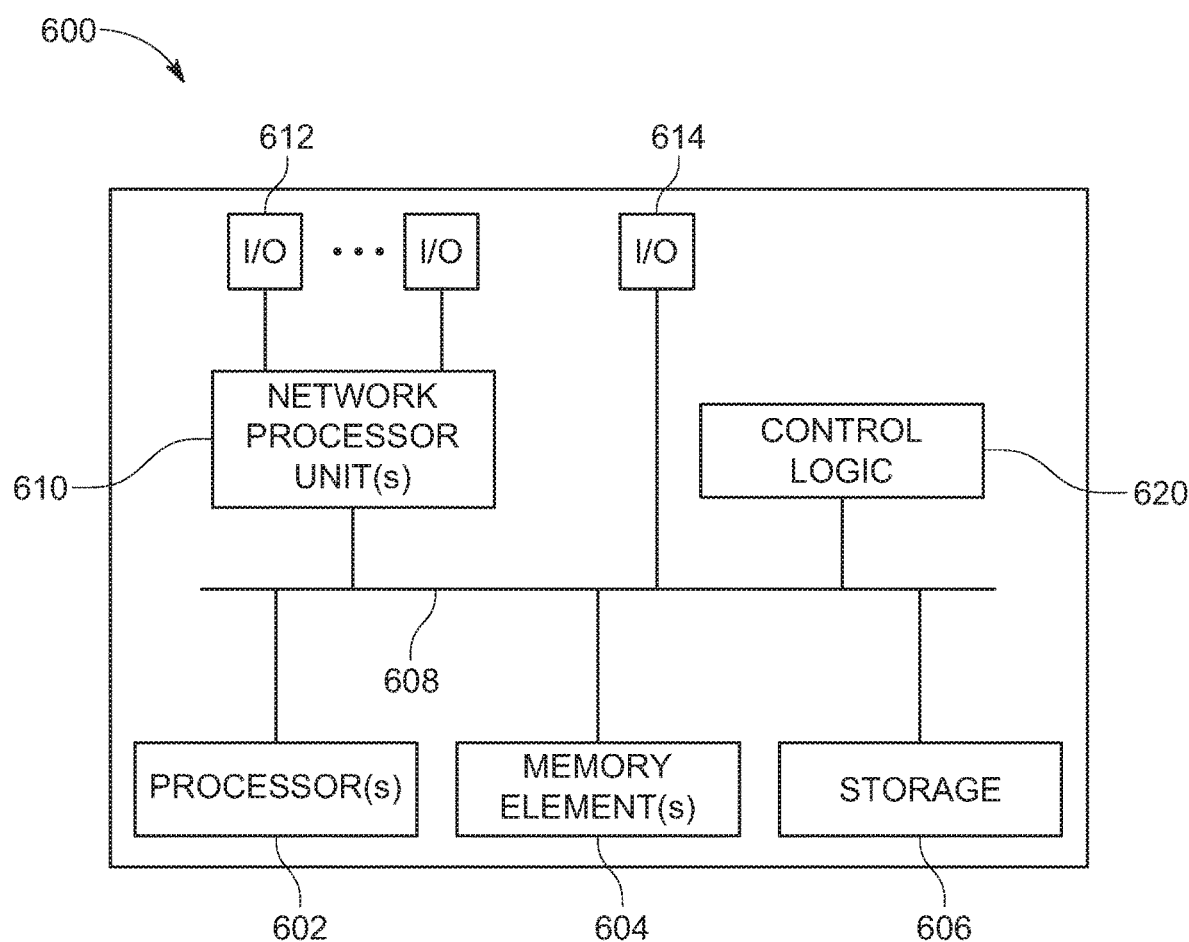
FIG. 7 is a hardware block diagram of a computing device that may be configured to perform secondary node addition/modification and deletion procedures presented herein, according to an example embodiment.

Referring to FIG. 7, a hardware block diagram is provided of a computing device 600 that may perform functions associated with operations described herein in connection with the FIGS. 1-6. In various embodiments, a computing device, such as computing device 600 or any combination of computing devices 600, may be configured as any entity/entities as discussed for the techniques depicted in connection with FIGS. 1-6 in order to perform operations of the various techniques discussed herein.

In at least one embodiment, the computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 804 and/or storage 606. Note that in some embodiments, storage 606 can be consolidated with memory element(s) 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interface(s) 612 may include suitable interfaces for receiving, transmitting, and/or otherwise communicating data and/or information in a network environment.

I/O interface(s) 614 allow for input and output of data and/or information with other entities that may be connected to computer device 600. For example, I/O interface(s) 614 may provide a connection to external devices such as a keyboard, keypad, a touch screen, and/or any other suitable input and/or output device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, random access memory (RAM), read only memory (ROM), erasable programmable read only memory (EPROM), application specific integrated circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, digital signal processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory element(s) 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, CD-ROM, DVD, memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to a computing device for transfer onto another computer readable storage medium.

Variations and Implementations

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any local area network (LAN), virtual LAN (VLAN), wide area network (WAN) (e.g., the Internet), software defined WAN (SD-WAN), wireless local area (WLA) access network, wireless wide area (WWA) access network, metropolitan area network (MAN), Intranet, Extranet, virtual private network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™, mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may directly or indirectly connected utilizing any algorithms, communication protocols, interfaces, etc. (proprietary and/or non-proprietary) that allow for the exchange of data and/or information.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments. Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of can be represented using the'(s)' nomenclature (e.g., one or more element(s)).

In summary, in one form, a method is provided comprising: at a packet data network gateway entity in a mobile core network, receiving a first modify bearer request message that includes a secondary node status change indication for wireless access network service being provided to a user equipment that has dual connectivity capability to wirelessly connect to a first access network and to a second access network, the secondary node status change indication including information indicating a change in user-data session serving network status as between the user equipment and a first radio access network element in the first access network or a second radio access network element in the second access network; detecting the secondary node status change indication in the first modify bearer request message; and based on detecting the secondary node status change indication in the first modify bearer request message, sending to a policy and charging rules entity a first request update message that includes information about the change in user-data session serving network status.

In another form, an apparatus is provided comprising: a communication interface configured to enable communication on behalf of a packet data network gateway entity in a mobile core network; a memory; one or more processors coupled to the memory and the communication interface, wherein the one or more processors are configured to: obtain a first modify bearer request message that includes a secondary node status change indication for wireless access network service being provided to a user equipment that has dual connectivity capability to wirelessly connect to a first access network and to a second access network, the secondary node status change indication including information indicating a change in user-data session serving network status as between the user equipment and a first radio access network element in the first access network or a second radio access network element in the second access network; detect the secondary node status change indication in the first modify bearer request message; and based on detecting the secondary node status change indication in the first modify bearer request message, provide to a policy and charging rules entity a first request update message that includes information about the change in user-data session serving network status.

In still another form, one or more non-transitory computer readable storage media are provided, encoded with instructions that, when executed by one or more processors on behalf of a packet data network gateway entity in a mobile network, cause the one or more processors to perform operations including: obtaining a first modify bearer request message that includes a secondary node status change indication for wireless access network service being provided to a user equipment that has dual connectivity capability to wirelessly connect to a first access network and to a second access network, the secondary node status change indication including information indicating a change in user-data session serving network status as between the user equipment and a first radio access network element in the first access network or a second radio access network element in the second access network; detecting the secondary node status change indication in the first modify bearer request message; and based on detecting the secondary node status change indication in the first modify bearer request message, providing to a policy and charging rules entity a first request update message that includes information about the change in user-data session serving network status.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method comprising:
at a packet data network gateway entity in a mobile core network, receiving a first modify bearer request message that includes a secondary node status change indication for wireless access network service being provided to a user equipment that has dual connectivity capability to wirelessly connect to a first access network and to a second access network, the secondary node status change indication including information indicating a change in user-data session serving network status as between the user equipment and a first radio access network element in the first access network or a second radio access network element in the second access network, the packet data network gateway entity being configured with a secondary node status information change event trigger;
detecting the secondary node status change indication in the first modify bearer request message; and
based on detecting the secondary node status change indication in the first modify bearer request message, sending to a policy and charging rules entity a first request update message that includes information about the change in user-data session serving network status.

2. The method of claim 1, further comprising:
receiving, in response to the first request update message, from the policy and charging rules entity a first answer update message indicating a change from a first charging policy to a second charging policy; and
applying the second charging policy to traffic for the user equipment at the packet data network gateway entity.

3. The method of claim 2, wherein:
the first modify bearer request message is received from a mobility management entity in the mobile core network;
the secondary node status change indication in the first modify bearer request message includes information that indicates an addition or modification of the second radio access network element in the second access network for serving the user equipment; and
the second charging policy pertains to usage by the user equipment in the second access network.

4. The method of claim 3, further comprising:
sending to an online charging entity a credit control request update message that indicates the user equipment is being served by the second access network; and
receiving from the online charging entity a credit answer update that includes a quota assignment for the user equipment in the second access network to enhance user equipment experience by granting more usage quota for data being served through the second access network.

5. The method of claim 2, wherein the secondary node status change indication is a first secondary node status change indication, further comprising, subsequent to applying the second charging policy:
receiving a second modify bearer request message that includes a second secondary node status change indication that includes information indicating removal of the second radio access network element in the second access network for serving the user equipment; and
sending to the policy and charging rules entity a second request update message that includes information indicating removal of the second radio access network element in the second access network for serving the user equipment.

6. The method of claim 5, further comprising:
receiving, in response to the second request update message, from the policy and charging rules entity, a second answer update message indicating a change from the second charging policy to the first charging policy; and
applying the first charging policy to traffic for the user equipment at the packet data network gateway entity.

7. The method of claim 5, further comprising:
sending to an online charging entity a credit control request update message that indicates the user equipment is being served by the first access network; and
receiving from the online charging entity a credit control answer update message that includes a quota assignment for the user equipment in the first access network.

8. The method of claim 1, further comprising:
sending to the policy and charging rules entity an initial credit control request message that includes information describing a type and profile of the user equipment; and
responsive to the initial credit control request message, receiving from the policy and charging rules entity an initial credit control answer message that contains information configured to cause installing of the secondary node status information change event trigger on the packet data network gateway entity.

9. The method of claim 8, further comprising:
in response to receiving the first modify bearer request message that includes the secondary node status change indication, generating the information about the change in user-data session serving network status included in first request update message based on the information contained in the initial credit control answer message.

10. The method of claim 9, wherein the information about the change in user-data session serving network status comprises an attribute value pair that indicates whether the user equipment is being served by the first radio access network element in the first access network or the second radio access network element in the second access network.

11. An apparatus comprising:
a communication interface configured to enable communication on behalf of a packet data network gateway entity in a mobile core network, the packet data network gateway entity being configured with a secondary node status information change event trigger;
a memory; and
one or more processors coupled to the memory and the communication interface, wherein the one or more processors are configured to:
obtain a first modify bearer request message that includes a secondary node status change indication for wireless access network service being provided to a user equipment that has dual connectivity capability to wirelessly connect to a first access network and to a second access network, the secondary node status change indication including information indicating a change in user-data session serving network status as between the user equipment and a first radio access network element in the first access network or a second radio access network element in the second access network;
detect the secondary node status change indication in the first modify bearer request message; and
based on detecting the secondary node status change indication in the first modify bearer request message, provide to a policy and charging rules entity a first request update message that includes information about the change in user-data session serving network status.

12. The apparatus of claim 11, wherein the one or more processors are further configured to:
provide to the policy and charging rules entity an initial credit control request message that includes information describing a type and profile of the user equipment; and
responsive to the initial credit control request message, obtain from the policy and charging rules entity an initial credit control answer message that contains information configured to cause installing of the secondary node status information change event trigger on the packet data network gateway entity.

13. The apparatus of claim 12, wherein the one or more processors are further configured to:
in response to obtaining the first modify bearer request message that includes the secondary node status change indication, generating the information about the change in user-data session serving network status included in first request update message based on the information contained in the initial credit control answer message.

14. The apparatus of claim 13, wherein the information about the change in user-data session serving network status comprises an attribute value pair that indicates whether the user equipment is being served by the first radio access network element in the first access network or the second radio access network element in the second access network.

15. The apparatus of claim 11, wherein the one or more processors are configured to:
  obtain, in response to the first request update message, from the policy and charging rules entity a first answer update message indicating a change from a first charging policy to a second charging policy; and
  apply the second charging policy to traffic for the user equipment at the packet data network gateway entity;
  wherein:
    the first modify bearer request message is received from a mobility management entity in the mobile core network;
    the secondary node status change indication in the first modify bearer request message includes information that indicates an addition or modification of the second radio access network element in the second access network for serving the user equipment; and
    the second charging policy pertains to usage by the user equipment in the second access network.

16. The apparatus of claim 15, wherein the secondary node status change indication is a first secondary node status change indication, wherein the processor is configured to, subsequent to applying the second charging policy:
  obtain a second modify bearer request message that includes a second secondary node status change indication that includes information indicating removal of the second radio access network element in the second access network for serving the user equipment; and
  provide to the policy and charging rules entity a second request update message that includes information indicating removal of the second radio access network element in the second access network for serving the user equipment.

17. The apparatus of claim 11, wherein the one or more processors are configured to:
  provide to an online charging entity a credit control request update message that indicates the user equipment is being served by the second access network; and
  obtain from the online charging entity a credit answer update that includes a quota assignment for the user equipment in the second access network to enhance user equipment experience by granting more usage quota for data being served through the second access network.

18. One or more non-transitory computer readable storage media encoded with instructions that, when executed by one or more processors on behalf of a packet data network gateway entity in a mobile network, cause the one or more processors to perform operations including:
  obtaining a first modify bearer request message that includes a secondary node status change indication for wireless access network service being provided to a user equipment that has dual connectivity capability to wirelessly connect to a first access network and to a second access network, the secondary node status change indication including information indicating a change in user-data session serving network status as between the user equipment and a first radio access network element in the first access network or a second radio access network element in the second access network;
  detecting the secondary node status change indication in the first modify bearer request message; and
  based on detecting the secondary node status change indication in the first modify bearer request message and based on the packet data network gateway entity being configured with a secondary node status information change event trigger, providing to a policy and charging rules entity a first request update message that includes information about the change in user-data session serving network status.

19. The one or more non-transitory computer readable storage media of claim 18, further comprising instructions that, when executed by the one or more processors, cause the one or more processors to perform operations including:
  providing to the policy and charging rules entity an initial credit control request message that includes information describing a type and profile of the user equipment; and
  responsive to the initial credit control request message, obtaining from the policy and charging rules entity an initial credit control answer message that contains information configured to cause installing of the secondary node status information change event trigger on the packet data network gateway entity.

20. The one or more non-transitory computer readable storage media of claim 19, further comprising instructions that, when executed by the one or more processors, cause the one or more processors to perform operations including:
  in response to obtaining the first modify bearer request message that includes the secondary node status change indication, generating the information about the change in user-data session serving network status included in first request update message based on the information contained in the initial credit control answer message.

* * * * *